(12) United States Patent
Gradl

(10) Patent No.: US 6,842,037 B1
(45) Date of Patent: Jan. 11, 2005

(54) SHARED TRANSMISSION LINE COMMUNICATION SYSTEM AND METHOD

(75) Inventor: David A. Gradl, Naperville, IL (US)

(73) Assignee: Lattice Semiconductor Corporation, Hillsboro, OR (US)

(*) Notice: Subject to any disclaimer, the term of this patent is extended or adjusted under 35 U.S.C. 154(b) by 0 days.

(21) Appl. No.: 10/655,686

(22) Filed: Sep. 4, 2003

(51) Int. Cl.[7] .............................................. H03K 17/14
(52) U.S. Cl. ......................... 326/30; 326/115; 326/126
(58) Field of Search .............................. 326/26, 27, 30, 326/82, 83, 112, 115, 119, 126, 127

(56) References Cited

U.S. PATENT DOCUMENTS

| 6,437,599 | B1 |   | 8/2002  | Groen        |         |
|-----------|----|---|---------|--------------|---------|
| 6,438,159 | B1 | * | 8/2002  | Uber et al.  | 375/225 |
| 6,462,852 | B1 |   | 10/2002 | Paschal et al. |       |
| 6,490,325 | B1 | * | 12/2002 | Fiedler et al. | 375/257 |
| 6,507,225 | B2 | * | 1/2003  | Martin et al. | 327/108 |
| 6,556,628 | B1 | * | 4/2003  | Poulton et al. | 375/257 |
| 6,563,322 | B1 | * | 5/2003  | Hannan       | 324/522 |

OTHER PUBLICATIONS

U.S. Patent Application Publication No. US 2003/0085736 A1 entitled "Interchangeable CML/VDS Data Transmission Circuit", filed on Jan. 29, 2002.

* cited by examiner

Primary Examiner—Don Le
(74) Attorney, Agent, or Firm—MacPherson Kwok Chen & Heid LLP; Greg J. Michelson

(57) ABSTRACT

Systems and methods are disclosed for sharing a transmission line among different interface technologies. For example, in accordance with an embodiment of the present invention, two different high-speed differential interface technologies (CML and LVDS) share a communication channel.

19 Claims, 2 Drawing Sheets

SHARED TRANSMISSION LINE COMMUNICATION SYSTEM AND METHOD

TECHNICAL FIELD

The present invention relates generally to electrical circuits and, more particularly, to techniques for sharing a communication channel of a communication system.

BACKGROUND

High-speed communication channels, such as for example electrical transmission lines across equipment backplanes of electronic equipment, are often a scarce resource. Furthermore, the associated equipment, such as connector pins or printed circuit board (PCB) transmission lines, are often a limited and expensive part of a communication system.

In a typical communication system, dedicated transmission lines are often provided for each circuit in the communication system, even if it is anticipated that the transmission lines will not be used continuously, because switching the connections of high-speed circuits to share the same transmission line is generally technically difficult and expensive. Also, sharing the same transmission line may severely degrade the high-frequency capability of the transmission line, especially if the circuits that share the transmission line employ different technology standards (e.g., communication or interface standards).

However, if different electrical circuits were able to share the same transmission line (e.g., backplane transmission line), greater efficiencies may be achieved along with possibly increased equipment capacity and/or reduced costs. As a result, there is a need for improved techniques for sharing communication channels.

SUMMARY

Systems and methods are disclosed herein for sharing a communication channel. For example, in accordance with an embodiment of the present invention, a technique for sharing a transmission line between two different high-speed differential interface technologies (current mode logic (CML) and low voltage differential signal (LVDS)) is disclosed. The transmission line is shared by a CML transmitter and a LVDS transmitter at one end and by a CML receiver and a LVDS receiver at the other end. The transmission line may then selectively communicate CML signals or LVDS signals.

More specifically, in accordance with one embodiment of the present invention, a circuit includes a communication channel having a first and second end; a current mode logic transmitter coupled to the first end of the communication channel; a low voltage differential signal transmitter coupled to or couplable to the first end of the communication channel; a current mode logic receiver coupled to the second end of the communication channel; and a low voltage differential signal receiver coupled to or couplable to the second end of the communication channel while the current mode logic receiver remains coupled to the second end of the communication channel.

In accordance with another embodiment of the present invention, a communication system includes a communication channel having a first and second end; a current mode logic transmitter; a first and second diode coupling the current mode logic transmitter to the first end of the communication channel; a low voltage differential signal transmitter coupled to the first end of the communication channel; a low voltage differential signal receiver coupled to the second end of the communication channel; and a current mode logic receiver coupled to the second end of the communication channel.

In accordance with another embodiment of the present invention, a method of sharing a communication channel includes providing a current mode logic transmitter and receiver and a low voltage differential signal transmitter and receiver which are couplable or coupled to the communication channel; applying power to at least one internal resistor of the current mode logic receiver when the communication channel is to carry current mode logic signals; removing power from the at least one internal resistor of the current mode logic receiver when the communication channel is to carry low voltage differential signals, wherein the current mode logic receiver provides a termination impedance with the at least one internal resistor for the communication channel when the communication channel is to carry low voltage differential signals; and isolating electrically the low voltage differential signal transmitter and receiver when the communication channel is to carry current mode logic signals.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
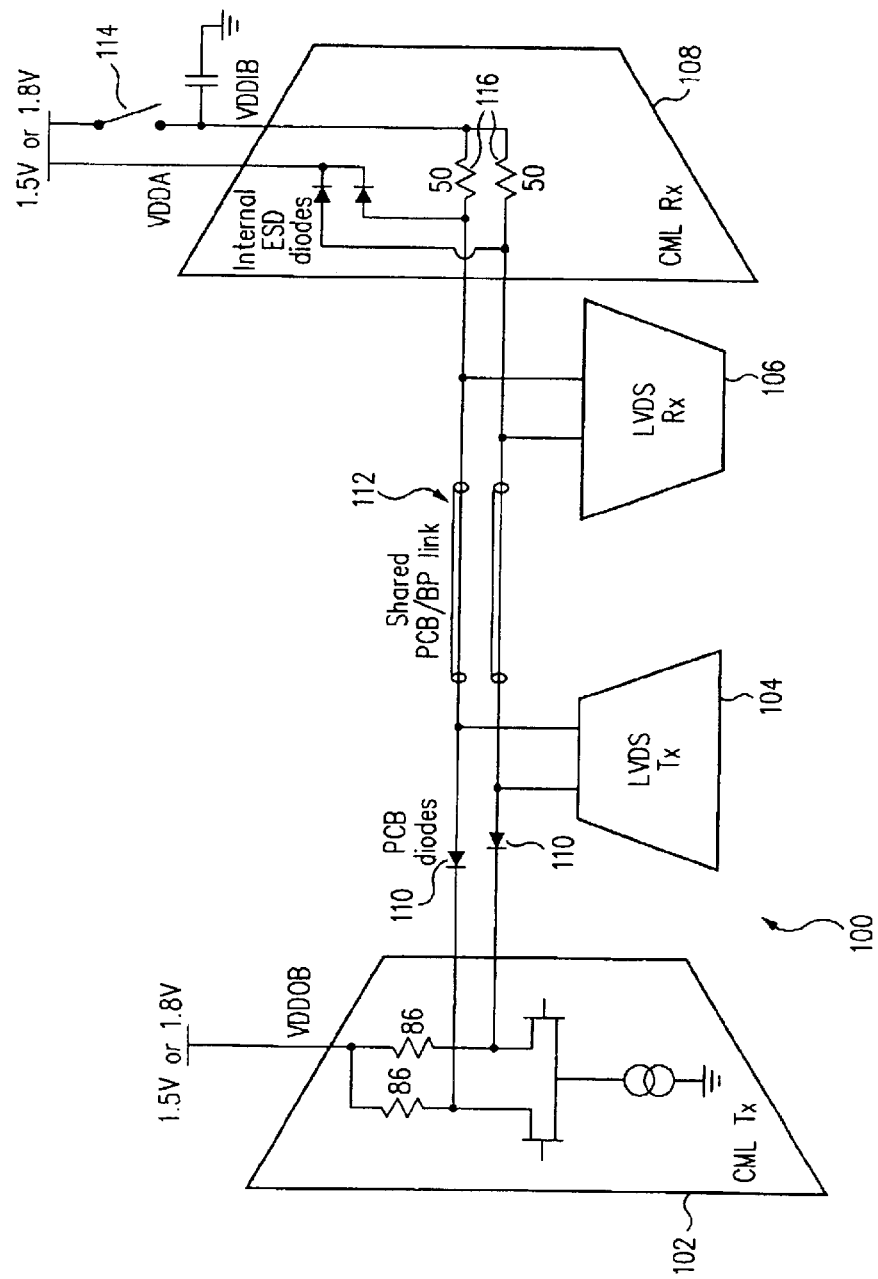
FIG. 1 shows a block diagram illustrating a shared transmission line technique in accordance with an embodiment of the present invention.

FIG. 1 shows a block diagram of a circuit 100 illustrating a shared transmission line technique in accordance with an embodiment of the present invention. Circuit 100 includes a current mode logic (CML) transmitter 102, a low voltage differential signal (LVDS) transmitter 104, a LVDS receiver 106, and a CML receiver 108.

CML transmitter 102 and LVDS transmitter 104 are coupled to one end of a communication channel 112 (e.g., a printed circuit board (PCB) trace or backplane differential transmission line). A diode 110 (e.g., a PCB diode) is employed to couple each output lead of CML transmitter 102 to a corresponding lead of communication channel 112.

CML receiver 108 and LVDS receiver 106 are coupled to the other end of communication channel 112. A switch 114, such as a metal oxide semiconductor field effect transistor (MOSFET), functions as a direct current (DC) switching device (e.g., external to CML receiver 108) to connect or disconnect a power supply (e.g., 1.5 V) to internal termination resistors 116 of CML receiver 108.

In terms of general operation, if CML communication signals are to be communicated through communication channel 112, LVDS transmitter 104 and LVDS receiver 106 (i.e., the LVDS buffers) are switched off (e.g., powered down, disabled, or electrically decoupled from communication channel 112) along with their switchable termination resistors (e.g., as discussed in reference to FIG. 2) to electrically isolate LVDS transmitter 104 and LVDS receiver 106 from communication channel 112. CML transmitter 102 and CML receiver 108 (i.e., the CML buffers) are switched on, with switch 114 coupling the power supply to internal termination resistors 116 (e.g., 50 ohms) of CML receiver 108 (i.e., at an input terminal (labeled VDDIB)).

The operating voltages of CML transmitter 102 and CML receiver 108 are provided such that diodes 110 are forward biased to allow the output signals of CML transmitter 102 to propagate through diodes 110 and be received by CML receiver 108 via communication channel 112. Thus, for example, a forward biasing current for diodes 110 is provided by CML transmitter 102 when a logic low state occurs on each output terminal of CML transmitter 102.

Figure 2:
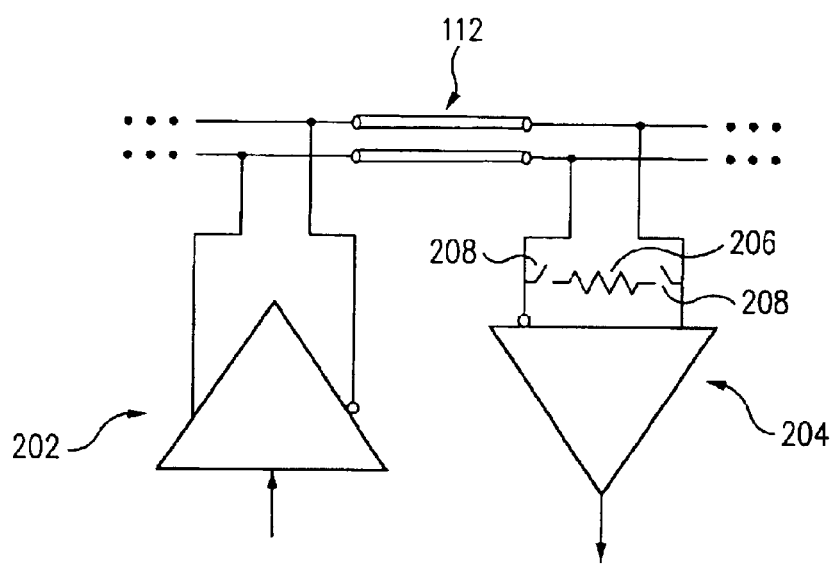
FIG. 2 shows a block diagram illustrating low voltage differential signal buffers in accordance with an embodiment of the present invention.

In accordance with an embodiment of the present invention, FIG. 2 shows a block diagram of LVDS buffers 202 and 204, which are exemplary implementations for LVDS transmitter 104 and LVDS receiver 106, respectively. LVDS buffer 204 includes a resistor 206, which may be selectively coupled across the input terminals of LVDS buffer 204 via switches 208. LVDS buffer 202 is shown without a resistor coupled across its output terminals, but may include one in a similar fashion as shown for LVDS buffer 204 (e.g., a resistor coupled via switches across its output terminals leading to communication channel 112. It should also be understood that there are numerous types of LVDS buffers, which may be implemented in accordance with the principles of the present invention for LVDS transmitter 104 and LVDS receiver 106.

Returning to FIG. 1, if LVDS communication signals are to be communicated through communication channel 112, CML transmitter 102 is switched off and switch 114 decouples the power supply from internal termination resistors 116 of CML receiver 108. LVDS transmitter 104 and LVDS receiver 106 are switched on (e.g., powered on, enabled, or otherwise electrically coupled to communication channel 112), but their internal switchable termination resistors (if they exist) are not utilized (i.e., the resistors are not electrically coupled to communication channel 112 or switched into an operating position). Consequently, a reverse DC voltage will exist across diodes 110, which will isolate the internal resistors in CML transmitter 102 (e.g., the 86 ohm resistors shown in FIG. 1) from LVDS transmitter 104.

Because switch 114 decouples the power supply from resistors 116 of CML receiver 108, the input terminal (VDDIB) will electrically float, which will allow resistors 116 in CML receiver 108 (i.e., two 50 ohm resistors shown in FIG. 1) to provide the desired differential termination (e.g., 100 ohms) at the receiver end of communication channel 112 for LVDS communication signals. It should be noted that, for general operation, diodes 110 should be implemented as low capacitance and low forward voltage drop diodes and short (e.g., PCB) trace stub lengths should be employed to couple LVDS transmitter 104 and LVDS receiver 106 to communication channel 112.

In accordance with one or more embodiments of the present invention, techniques are disclosed that allow CML and LVDS signal connections on the same communication channel (e.g., transmission line) and the transmission of CML and LVDS signals to occur over the same communication channel. For example, in accordance with an embodiment of the present invention, CML and LVDS buffers are situated at each end of a shared transmission line. The CML and LVDS buffers are then activated and isolated in a described manner, which allows high-bandwidth operation in either mode (e.g., 1.25 Gbps in CML mode or 622 Mbps in LVDS mode). This technique may provide certain advantages, such as for example being electrically controlled (e.g., as opposed to manual switching of connections) and utilizing solid-state low cost external devices to implement.

Embodiments described above illustrate but do not limit the invention. It should also be understood that numerous modifications and variations are possible in accordance with the principles of the present invention. Accordingly, the scope of the invention is defined only by the following claims.

I claim:

1. A circuit comprising:
   a communication channel having a first and second end;
   a current mode logic transmitter coupled to the first end of the communication channel;
   a low voltage differential signal transmitter coupled to or couplable to the first end of the communication channel;
   a current mode logic receiver coupled to the second end of the communication channel; and
   a low voltage differential signal receiver coupled to or couplable to the second end of the communication channel while the current mode logic receiver remains coupled to the second end of the communication channel.

2. The circuit of claim 1, wherein the communication channel comprises a differential printed circuit board trace or a differential transmission line.

3. The circuit of claim 1, further comprising a pair of diodes, disposed between the current mode logic transmitter and the communication channel, adapted to couple the current mode logic transmitter to the first end of the communication channel.

4. The circuit of claim 3, wherein the diodes comprise printed circuit board diodes having a low capacitance and a low forward voltage drop.

5. The circuit of claim 1, further comprising a pair of diodes, disposed between the current mode logic transmitter and the communication channel, adapted to couple the current mode logic transmitter to the first end of the communication channel, wherein the diodes are forward biased when the current mode logic transmitter is transmitting and are reverse biased when the low voltage differential signal transmitter is transmitting.

6. The circuit of claim 1, wherein the low voltage differential signal transmitter and the low voltage differential signal receiver are electrically isolated from the communication channel when the current mode logic transmitter is transmitting.

7. The circuit of claim 1, wherein the current mode logic receiver provides a termination impedance for the communication channel when the low voltage differential signal transmitter is transmitting.

8. The circuit of claim 1, further comprising a switch adapted to couple a power supply voltage to resistors of the current mode logic receiver when the current mode logic transmitter is transmitting.

9. A communication system comprising:

a communication channel having a first and second end;

a current mode logic transmitter;

a first and second diode coupling the current mode logic transmitter to the first end of the communication channel;

a low voltage differential signal transmitter coupled to the first end of the communication channel;

a low voltage differential signal receiver coupled to the second end of the communication channel; and a current mode logic receiver coupled to the second end of the communication channel.

10. The communication system of claim 9, wherein the first and second diodes are forward biased when the communication channel is carrying current mode logic signals and reverse biased when the communication channel is carrying low voltage differential signals.

11. The communication system of claim 9, wherein the current mode logic receiver is adapted to provide a termination impedance for the communication channel when the communication channel is carrying low voltage differential signals.

12. The communication system of claim 9, wherein the low voltage differential signal transmitter and the low voltage differential signal receiver are electrically isolated from the communication channel when the communication channel is carrying current mode logic signals.

13. The communication system of claim 9, further comprising a switch adapted to couple a power supply to at least one resistor of the current mode logic receiver, wherein the switch couples the power supply to the at least one resistor of the current mode logic receiver when the communication channel is to carry current mode logic signals.

14. The communication system of claim 13, wherein the switch decouples the power supply from the at least one resistor of the current mode logic receiver when the communication channel is to carry low voltage differential signals.

15. A method of sharing a communication channel, the method comprising:

providing a current mode logic transmitter and receiver and a low voltage differential signal transmitter and receiver which are couplable or coupled to the communication channel;

applying power to at least one internal resistor of the current mode logic receiver when the communication channel is to carry current mode logic signals;

removing power from the at least one internal resistor of the current mode logic receiver when the communication channel is to carry low voltage differential signals, wherein the current mode logic receiver provides a termination impedance with the at least one internal resistor for the communication channel when the communication channel is to carry low voltage differential signals; and isolating electrically the low voltage differential signal transmitter and receiver when the communication channel is to carry current mode logic signals.

16. The method of claim 15, further comprising providing a pair of diodes in series between the current mode logic transmitter and the communication channel, wherein the diodes are forward biased when the communication channel carries current mode logic signals and the diodes are reverse biased when the communication channel carries low voltage differential signals.

17. The method of claim 15, wherein the applying power and the removing power from the at least one internal resistor of the current mode logic receiver is controlled through a switch external to the current mode logic receiver.

18. The method of claim 15, wherein termination resistors within the low voltage differential signal receiver are not used when the communication channel carries low voltage differential signals.

19. The method of claim 15, wherein the termination impedance is 100 ohms.

* * * * *